(12) United States Patent
Barr et al.

(10) Patent No.: US 7,100,056 B2
(45) Date of Patent: *Aug. 29, 2006

(54) SYSTEM AND METHOD FOR MANAGING PROCESSOR VOLTAGE IN A MULTI-PROCESSOR COMPUTER SYSTEM FOR OPTIMIZED PERFORMANCE

(75) Inventors: Andrew H. Barr, Roseville, CA (US); Ricardo Espinoza-Ibarra, Carmichael, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 509 days.

This patent is subject to a terminal disclaimer.

(21) Appl. No.: 10/216,286

(22) Filed: Aug. 12, 2002

(65) Prior Publication Data

US 2004/0030942 A1    Feb. 12, 2004

(51) Int. Cl.
*G06F 1/26* (2006.01)
(52) U.S. Cl. ...................................... 713/300; 713/320
(58) Field of Classification Search ................ 713/300, 713/322, 600
See application file for complete search history.

(56) References Cited

U.S. PATENT DOCUMENTS

| | | | |
|---|---|---|---|
| 5,491,787 A * | 2/1996 | Hashemi ...................... | 714/11 |
| 6,141,762 A | 10/2000 | Nicol et al. | |
| 6,191,499 B1 | 2/2001 | Severson et al. | |
| 6,233,635 B1 | 5/2001 | Son | |
| 6,795,928 B1 * | 9/2004 | Bradley et al. .............. | 713/320 |
| 6,804,790 B1 * | 10/2004 | Rhee et al. .................. | 713/320 |
| 6,836,849 B1 * | 12/2004 | Brock et al. ................. | 713/310 |
| 2002/0007463 A1 | 1/2002 | Fung | |
| 2002/0147932 A1 | 10/2002 | Brock et al. | |
| 2003/0120963 A1 * | 6/2003 | Jahnke ....................... | 713/322 |

FOREIGN PATENT DOCUMENTS

| | | |
|---|---|---|
| DE | 19600210 | 7/1996 |
| EP | 991191 | 3/2001 |
| EP | 978781 | 4/2003 |
| EP | 1182548 | 10/2003 |
| EP | 1182552 | 10/2003 |
| WO | WO 03/014902 | 2/2003 |
| WO | WO 03/027820 | 4/2003 |

OTHER PUBLICATIONS

Search Report issued on Dec. 19, 2003 in counterpart foreign application in GB under application No. 315100.8.

* cited by examiner

*Primary Examiner*—Chun Cao

(57) ABSTRACT

A method includes modulating a first voltage level of a first processor and a second voltage level of a second processor within a multi-processor computer system. The first processor operates at a first performance level and the second processor operates at a second performance level. The first performance level is higher than said second performance level. A system includes means for modulating a first voltage level of a first processor, which operates at a first performance level, and means for modulating a second voltage level of a second processor, which operates at a second performance level, with a multi-processor computer system.

17 Claims, 5 Drawing Sheets

600

SYSTEM AND METHOD FOR MANAGING PROCESSOR VOLTAGE IN A MULTI-PROCESSOR COMPUTER SYSTEM FOR OPTIMIZED PERFORMANCE

CROSS-REFERENCE TO RELATED APPLICATIONS

This application is related to U.S. patent application Ser. No. 10/216,437, entitled "SYSTEM, METHOD AND APPARATUS FOR THE FREQUENCY MANAGEMENT OF BLADES IN A BLADED ARCHITECTURE BASED ON PERFORMANCE REQUIREMENTS" to Andrew H. BARR, et al.; U.S. patent application Ser. No. 10/216,438, entitled "SYSTEM AND METHOD FOR THE FREQUENCY MANAGEMENT OF COMPUTER SYSTEMS TO ALLOW CAPACITY ON DEMAND" to Andrew H. BARR, et al.; U.S. patent application Ser. No. 10/216,283, entitled "MANAGING AN OPERATING FREQUENCY OF PROCESSORS IN A MULTI-PROCESSOR COMPUTER SYSTEM" to Ricardo ESPINOZA-IBARRA, et al.; U.S. patent application Ser. No. 10/216,234, entitled "SYSTEM AND METHOD FOR LOAD DEPENDENT FREQUENCY AND PERFORMANCE MODULATION IN BLADED SYSTEMS" to Ricardo ESPINOZA-IBARRA, et at.; U.S. patent application Ser. No. 10/216,284, entitled "VOLTAGE MANAGEMENT OF BLADES IN A BLADED ARCHITECTURE BASED ON PERFORMANCE REQUIREMENTS" to Andrew H. BARR, et at.; U.S. patent application Ser. No. 10/216,285, entitled "SYSTEM AND METHOD FOR MANAGING THE OPERATING FREQUENCY OF PROCESSORS OR BLADES" to Ricardo ESPINOZA-IBARRA, et al.; U.S. patent application Ser. No. 10/216,229, entitled "SYSTEM AND METHOD FOR MANAGING THE OPERATING FREQUENCY OF BLADES IN A BLADED-SYSTEM" to Ricardo ESPINOZA-IBARRA, et al.; U.S. patent application Ser. No. 10/216,233, entitled "VOLTAGE MANAGEMENT OF PROCESSORS IN A BLADED SYSTEM BASED ON LOADING" to Andrew H. BARR, et at.; U.S. patent application Ser. No. 10/216,232, entitled "SYSTEM AND METHOD FOR VOLTAGE MANAGEMENT OF A PROCESSOR TO OPTIMIZE PERFORMANCE AND POWER DISSIPATION" to Andrew H. BARR, et al., and U.S. patent application Ser. No. 10/216,435, entitled "MANAGEMENT OF A MEMORY SUBSYSTEM" to Andrew H. BARR, et at., all of which are concurrently herewith being filed under separate covers, the subject matters of which are herein incorporated by reference.

BACKGROUND

Multi-processor systems include many types of processors. The processors of a server are often housed together in a single structure, creating high-density systems with a modular architecture that ensures flexibility and scalability. Thus, this modular architecture reduces space requirements. Server processors, along with storage, networking and other types of processors, are typically installed in a common enclosure, or chassis, that hosts multiple processors that share common resources such as cabling, power supplies, and cooling fans.

Multi-processor systems create challenging engineering problems, due largely in part to heat produced by the processors and limited space in the chassis. Typically, multi-processor systems are limited by an underlying power and thermal envelope. For example, a chassis that hosts a multi-processor system may only be designed to utilize a limited number of watts. That is, the chassis can only consume so much power and is limited in the amount of airflow that is available to cool the processors in the chassis.

Engineering challenges occur in optimizing the tradeoff between performance and thermal and power requirements. In a multi-processor system multiple processors, each representing a separate system, are present in the same chassis. Associated with the chassis are a specific set of power and thermal requirements. Specifically, these requirements put a limit on the amount of power that can be consumed by the respective processors. Known power limiting strategies include powering down a CPU functional unit, e.g., a floating-point unit or an on-die cache, or trading off speed for reduced power consumption in a hard drive.

This power limitation puts a constraint on the frequency that the processors can run, and thus, limits the performance. In addition, the processors in a system are usually all configured to operate at the same frequency. This further limits the ability for the individual processors to operate at optimal performance and capacity.

Prior solutions run all the processors at a performance level less than their maximum in order to meet the overall chassis power and thermal cooling budget. A disadvantage associated with this solution is that the performance of each processor is degraded or diminished to fall within these budgets. For example, if the ability of the chassis to cool is limited to X and there are Y processors, each processor can only contribute approximately X/Y to the dissipated power in the chassis. Thus, each processor is limited to the performance associated with an X/Y power level.

Another solution has been to add a plurality of loud, space-consuming fans that require expensive control circuitry. These cooling systems increase the cost of the multi-processor system, leave less space for other features within the chassis for other features, and run a higher risk for failures and increased downtime. Other solutions have included limiting the number of I/O cards in the multi-processor system, as well as restricting the number of other use features. A further solution has been to reduce the power budget available for other features in the multi-processor system.

What is needed is a method for optimizing the performance of a multi-processor system by modulating the voltage of the processors within the system in conjunction with the frequency of the processors to increase the thermal and power benefit of the multi-processor system.

SUMMARY

The method and system described in the present application is advantageous in allowing the voltage and frequency of an individual processor to be modulated in accordance with performance demands of that individual processor, and the overall system power and thermal budget of a multi-processor system.

These and other advantages are found, for example, in a method that includes modulating a first voltage level of a first processor within a processor-based system. The first processor operates at a first performance level. The method also includes modulating a second voltage level of a second processor within the processor-based system. The second processor operates at a second performance level. The first performance level is higher than said second performance level. The method maintains the overall power and thermal budget and optimizes performance by modulating the voltage in the blades in the processor-based computer system.

These and other advantages are also found, for example, in a system that includes means for modulating a first voltage level of a first processor within a processor-based system. The first processor operates at a first performance level. The system also includes means for modulating a second voltage level of a second processor within said processor-based system. The second processor operates at a second performance level. The first performance level is higher than said second performance level.

These and other advantages are further found, for example, in a system that includes a user interface, which receives an input signal. The input signal comprises instructions for modulating a first voltage level of a first processor, which performs at a first performance level, and a second voltage level of a second processor, which performs at a second performance level, and is defined by a user. The system also includes an Inter-IC bus and an input/output expander, which receives the input signal from the Inter-IC bus and generates a control signal. The control signal comprises information determined by the instructions contained in the input signal. The system further includes a DC-to-DC converter, which generates a first output voltage and a second output voltage based on information contained in the control signal and provides the first output voltage to the first processor and the second output voltage to the second processor. The first performance level is higher than the second performance level.

These and other advantages are also found in a system that includes a serial presence detect circuit, which computes a first output voltage of a first processor and a second output voltage of a second processor based on a first optimal performance level of the first processor and a second optimal performance level of the second processor. The serial presence detect circuit also generates an input signal, which comprises instructions for modulating a first voltage level of the first processor and a second voltage level of the second processor. The system also includes an Inter-IC bus and an input/output expander, which receives the input signal from the Inter-IC bus and generates a control signal, which comprises information determined by the instructions contained in the input signal. The system further includes a DC-to-DC converter, which generates the first output voltage and the second output voltage based on information contained in the control signal and provides the first output voltage to the first processor and the second output voltage to the second processor. The first performance level is higher than the second performance level.

These and other advantages are further found, for example, in a system that includes a manual configuration device, which provides an input signal. The input signal comprises instructions for modulating a first voltage level of a first processor, which performs at a first performance level, and a second voltage level of a second processor, which performs at a second performance level, and is defined by a user. The system also includes a DC-to-DC converter, which generates a first output voltage and a second output voltage based on information contained in the control signal and provides the first output voltage to the first processor and the second output voltage to the second processor wherein the first performance level is higher than the second performance level.

These and other advantages are also found, for example, in a system that includes a user interface, which receives an input signal. The input signal comprises instructions for modulating a first voltage level of a first processor, which performs at a first performance level, and a second voltage level of a second processor, which performs at a second performance level, and is defined by a user. The system also includes an Inter-IC bus and a microprocessor, which receives the input signal from the Inter-IC bus and generates a control signal. The control signal comprises information determined by the instructions contained in the input signal. The system further includes a DC-to-DC converter, generates a first output voltage and a second output voltage based on information contained in the control signal and provides the first output voltage to the first processor and the second output voltage to the second processor. The first performance level is higher than the second performance level.

These and other advantages are also found, for example, in a system that includes a user interface, which receives an input signal. The input signal comprises instructions for modulating a first voltage level of a first processor, which performs at a first performance level, and a second voltage level of a second processor, which performs at a second performance level, and is defined by a user. The system also includes an Inter-IC bus and a microcontroller, which receives the input signal from the Inter-IC bus and generates a control signal. The control signal comprises information determined by the instructions contained in the input signal. They system further includes a DC-to-DC converter, which generates a first output voltage and a second output voltage based on information contained in the control signal and provides the first output voltage to the first processor and the second output voltage to the second processor. The first performance level is higher than the second performance level.

These and other advantages are further found, for example, in a system that includes a user interface, which receives an input signal. The input signal comprises instructions for modulating a first voltage level of a first processor, which performs at a first performance level, and a second voltage level of a second processor, which performs at a second performance level, and is defined by a user. The system also includes an Inter-IC bus and a field programmable gate array, receives the input signal from the Inter-IC bus and generates a control signal. The control signal comprises information determined by the instructions contained in the input signal. The system further includes a DC-to-DC converter, which generates a first output voltage and a second output voltage based on information contained in the control signal and provides the first output voltage to the first processor and the second output voltage to the second processor. The first performance level is higher than the second performance level.

These and other advantages are also found, for example, in a system that includes a user interface, which receives an input signal. The input signal comprises instructions for modulating a first voltage level of a first processor, which performs at a first performance level, and a second voltage level of a second processor, which performs at a second performance level, and is defined by a user. The system also includes an Inter-IC bus and a programmable logic device, which receives the input signal from the Inter-IC bus and generates a control signal. The control signal comprises information determined by the instructions contained in the input signal. The system further includes a DC-to-DC converter, which generates a first output voltage and a second output voltage based on information contained in the control signal and provides the first output voltage to the first processor and the second output voltage to the second processor. The first performance level is higher than the second performance level.

DESCRIPTION OF THE DRAWINGS

The detailed description will refer to the following drawings, wherein like numerals refer to like elements, and wherein.

DETAILED DESCRIPTION

Figure 1:
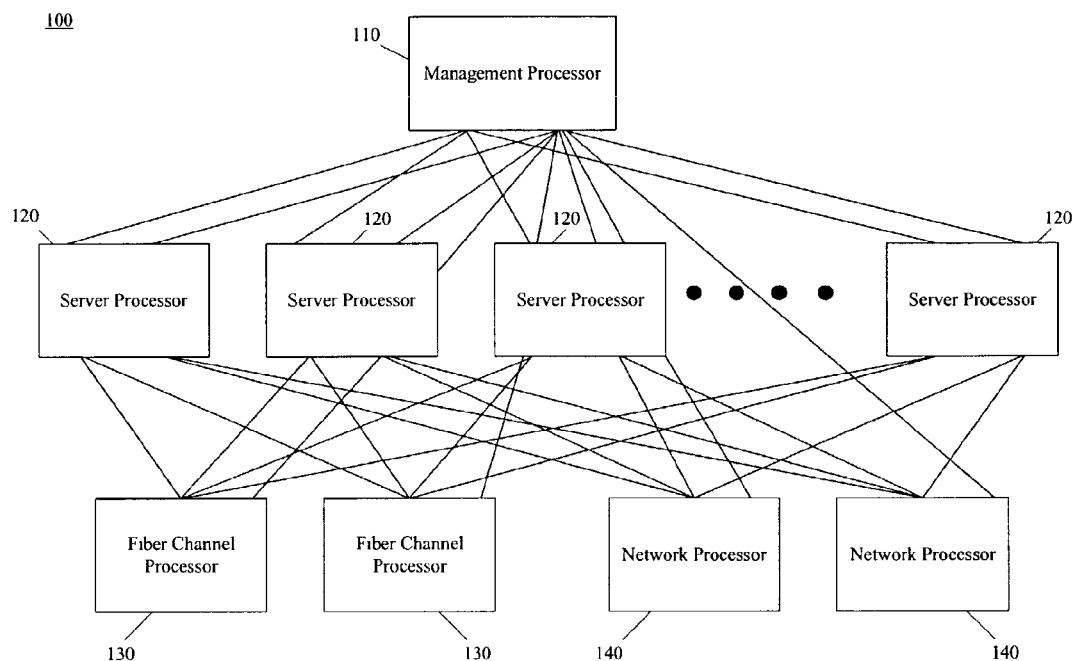
FIG. 1 shows a block diagram depicting one embodiment of the basic modular building blocks of a multi-processor system.

The preferred embodiments of the system and method for voltage modulation in conjunction with performance optimization at processor level will now be described in detail with reference to the following figures, in which like numerals refer to like elements. FIG. 1 illustrates a block diagram depicting one embodiment of the basic modular building blocks of a multi-processor system, generally designated by the reference numeral 100. A management processor 110 supervises the functions of the chassis and provides a single interface to the consoles of all the servers installed. As shown FIG. 1, the server processors 120 are in communication with the management processor 110. The server processors 120 are, in turn, in communication with other processors that perform specific functions. For example, as seen in the FIGURE, server processors 120 are in communication with fiber channel processors 130 and network processors 140. It is to be appreciated that the various processors in a multi-processor system 100 may be server processors, network processors, storage processors or storage interconnect processors, etc. In general, processors of the same type (server, fibre channel, network, etc.) contain the same hardware and software components, although the different processors may be running at a different voltage or frequency than other processors of the same type.

Although processors are typically general purpose servers by design, different processors within a chassis can host various applications that require different levels of performance. For example, a particular processor might sit idle much of the time because the application it hosts requires little processing capacity while another processor may host an application that requires heavy processing capacity.

By taking advantage of a processor's process requirements for higher or lower performance, each processor is allowed to run at an increased/decreased frequency and thus consume more or less of the chassis thermal and power budget. Management processors 110 that run processes that require a higher level of performance are run at a higher frequency and thus consume more of the chassis's thermal and power budget. Slave processors 120 that run background processes that require a lower level of performance are run at a lower frequency and thus consume less of the chassis's thermal and power budget. In either scenario, the overall thermal and power requirements of multi-processor system 100 are still met with a more optimal overall processor performance.

As discussed above, it is desirous to create a multi-processor system 100 in which it is possible to adjust the voltage of the processors 110, 120, 130, 140 individually. In one embodiment, the voltage and the frequency of a particular processor are adjusted simultaneously. One skilled in the art will appreciate that techniques described herein for modifying the voltage of a processor can also be used to modify the voltage used by a processor. In general, as the voltage of a processor is increased (within a specific range) the frequency at which the processor can run also increases. Conversely, as the voltage of the processor is decreased, the frequency at which the processor can run decreases. Thus, when the frequency of the processor is decreased because a lower level of performance is required, the voltage may also be decreased with the frequency, providing a large thermal and power relief. Because the power dissipated by the processor is proportional to the frequency and square of the voltage, modulating the voltage provides a large additional benefit over just modulating the frequency.

In many multi-processor systems 100 the voltage that a processor or memory runs off of is generated by a voltage converter called a DC-to-DC converter. The DC-to-DC converter takes in a global system power that operates all servers within a chassis, for example five volts, and from that global system power generates the specific voltage requirement for the individual processors 110, 120, 130, 140 hosted within the chassis. The DC-to-DC converter is typically controlled using an ASIC as the central controller within a circuit. The modulation of the voltage to processors 110, 120, 130, 140 can be accomplished by providing a serial or parallel digital input to "trim" pins on the DC-to-DC converter. By making small changes in a value at a given trim pin in the DC-to-DC converter circuit, the output voltage can be slightly increased or decreased. For example, two volts can be changed to 2.1, 2.2 volts, etc. FIGS. 2–5 illustrate different methodologies of the how the input to the trim pins of the DC-to-DC converter can be controlled. One of ordinary skill in the art would readily recognize that the principles disclosed herein may be applied to a variety of processor architectures, including PA-RISC, DEC Alpha, MIPS, PowerPC, SPARC, IA-32 and IA-64.

Figure 2:
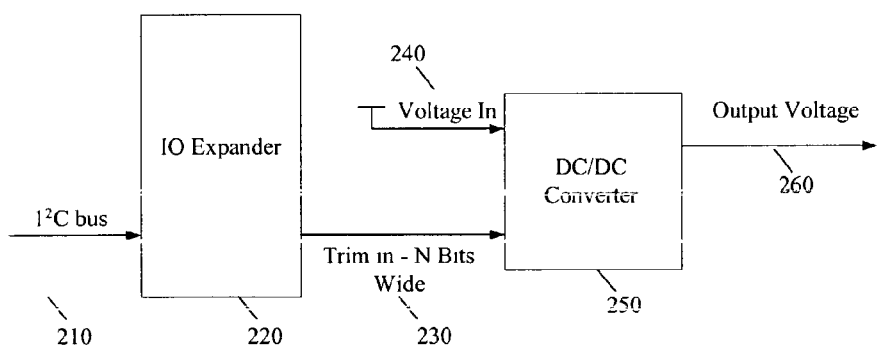
FIG. 2 illustrates a block diagram depicting one methodology of managing the operating voltage of individual processors by use of an input/output expander chip.

FIG. 2 illustrates a block diagram depicting an embodiment of a method of managing the operating voltage of individual processors by use of an Inter-IC ($I^2C$) device, such as an Input/Output (I/O) expander chip, generally designated by the reference numeral 200. $I^2C$ method 200 includes: providing a control signal from $I^2C$ bus 210; providing the control signal to an I/O expander chip 220; generating a "trim in" signal 230; providing a "voltage in" signal 240; providing the "voltage in" signal 240 to trim pins of a DC-to-DC converter 250; and generating an output voltage 260.

An $I^2C$ bus 210, or other control bus, is used to control I/O expander chip 220. As is known to those skilled in the art, $I^2C$ bus 210 is a bi-directional two-wire serial bus that provides a communication link between integrated circuits. In one embodiment, where processors 110, 120, 130, 140 are a PA-RISC processor, control signals are provided to $I^2C$ bus 210 manually using a Guardian Service Processor (GSP) console. GSP is a management consol that allows user control of various parameters of multi-processor system 100, for example, the voltage being provided to a particular processor 110, 120, 130, 140 or processor hosted within multi-processor system 100. The user-friendly interface of the GSP console allows the user to manually control the voltage of the processors 110, 120, 130, 140 within multi-processor system 100 without requiring knowledge of any low-level information, such as bit-settings.

In another embodiment, control signals are provided to I²C bus 210 automatically using serial presence detect (SPD) functionality. SPD is a serial bus that queries different parts of multi-processor system 100 to determine the loading status of optionally loaded features. These optionally loaded features include, for example, processors 110, 120, 130, 140 or any other board. Multi-processor system 100 can automatically detect the appropriate voltage for each processor 110, 120, 130, 140 that would maximize the performance of that processor 110, 120, 130, 140 within the thermal and power limits of multi-processor system 100. SPD utilizes I²C bus 210 to query all processors 110, 120, 130, 140 in multi-processor system 100 to determine how many processors are loaded with the chassis of multi-processor system 100, to determine the performance requirement for the processors 110, 120, 130, 140, etc. The information is then used to automatically modulate the voltage provided to processors 110, 120, 130, 140.

I/O expander chip 220 can be an inexpensive serial-to-parallel type of chip that is controlled using I²C bus 210. I/O expander chip 220 has input/output (I/O) ports that are forced to a particular state by writing to I/O expander chip 220 through an I²C command. Since I/O expander chip 220 is I²C based, I/O expander chip 220 can be controlled by any device that supports an I²C interface, such as a GSP or SPD, as described previously. I/O expander chip 220 typically has multiple I/O ports. Therefore, one I/O expander chip 220 can be used to control multiple DC-to-DC converters 250 individually. I/O expander chip 220 generates "trim in" signal 230, an N bits wide control signal that is input to the trim pins of DC-to-DC converter 250. The "trim in" signal 230 contains information regarding voltage modulation from the user. The "trim in" signal 230 is provided to DC-to-DC converter 250 to provide an appropriate input into the trim pins of DC-to-DC converter 250 to control the voltage of the processors 110, 120, 130, 140. The "voltage in" signal 240 is also provided to DC-to-DC converter 250 in order to provide a reference voltage level against which the processor voltage is compared. The reference voltage level represents the global system power of multi-processor systems 100, the maximum voltage accessible by any one processor 110, 120, 130, 140 hosted within multi-processor system 100. DC-to-DC converter 250 then generates the appropriate output voltage 260 for the processors 110, 120, 130, 140 to optimize performance of the processors 110, 120, 130, 140 within the thermal and power limitations of the multi-processor system 100. The output voltage 260 is applied to the various processors 110, 120, 130, 140 using the trim pins on DC-to-DC converter 250.

Figure 3:
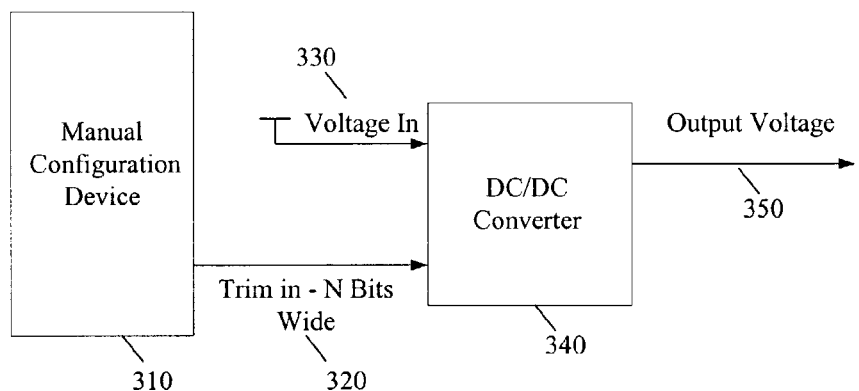
FIG. 3 illustrates a block diagram depicting an embodiment of a method of managing the operating voltage of individual processors by use of a manual configuration device.

FIG. 3 illustrates a block diagram depicting an embodiment of a method of managing the operating voltage of individual processors by use of a manual configuration device, generally designated by the reference numeral 300. Manual configuration device method 300 includes: setting manual configuration device 310 on the multi-processor system 100, generating a "trim in" signal 320; providing a "voltage in" signal 330; providing the "voltage in" signal 330 to trim pins of a DC-to-DC converter 340; and generating an output voltage 350.

One of ordinary skill in the art would recognize that there are many common manual configuration devices that are capable of performing the desired function, e.g., dip switches, jumpers installed over pin headers, rotational configuration switches, and solder bridges, etc. For example, in one embodiment, dip switches may be used as the manual configuration device 310. As known in the art, dip switches are a series of tiny switches built into circuit boards, for example, the circuit boards that comprise the processors 110, 120, 130, 140.

Manual configuration device 310 enables the user to configure the processors. In the present embodiment, the manual configuration device 310 allow the user to modulate the voltage being used by a particular processor 110, 120, 130, 140. The manual configuration device 310 may be added to a physically readily accessible part of multi-processor system 100, such as on an exterior portion of multi-processor system 100. Thus, the user, or operator, is allowed to manually set the voltage of the processors 110, 120, 130, 140 upon reboot of the multi-processor system 100, based on predetermined performance requirements. However, the user is required to know the appropriate settings of the configuration bits of the trim pins of DC-to-DC converter 450.

Manual configuration device 310 generates "trim in" signal 320, an N bits wide control signal that is input to the trim pins of DC-to-DC converter 340. The "trim in" signal 320 contains information regarding voltage modulation from the user. The "trim in" signal 320 is provided to DC-to-DC converter 340 to provide an appropriate input into the trim pins of DC-to-DC converter 340 to control the voltage of the processors 110, 120, 130, 140. The "voltage in" signal 330 is also provided to DC-to-DC converter 340 in order to provide a reference voltage level against which the processor voltage is compared. The reference voltage level represents the global system power of multi-processor systems 100, the maximum voltage accessible by any one processor 110, 120, 130, 140 hosted within multi-processor system 100. DC-to-DC converter 340 then generates the appropriate output voltage 350 for the processors 110, 120, 130, 140 to optimize performance of the processors 110, 120, 130, 140 within the thermal and power limitations of the multi-processor system 100. The output voltage 350 is applied to the various processors 110, 120, 130, 140 using the trim pins of DC-to-DC converter 340.

Figure 4:
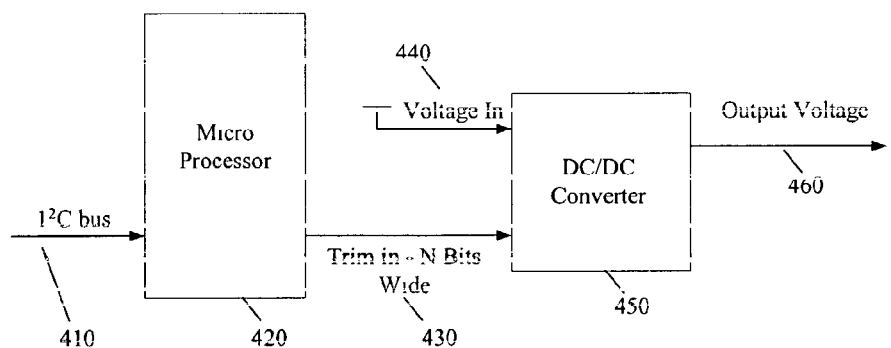
FIG. 4 illustrates a block diagram depicting an embodiment of a method of managing the operating voltage of individual processors by use of a microcontroller or microprocessor.

FIG. 4 illustrates a block diagram depicting an embodiment of a method of managing the operating voltage of individual processors by use of a microprocessor/microcontroller, generally designated by the reference numeral 400. Microprocessor method 400 includes: providing a control signal from I²C bus 410; providing the control signal to a microprocessor/microcontroller 420; generating a "trim in" signal 430; providing a "voltage in" signal 440; providing the "voltage in" signal 440 to trim pins of a DC-to-DC converter 450; and generating an output voltage 460.

An I²C bus 410 is used to control microprocessor/microcontroller 420. As is known to those skilled in the art, I²C bus 410 is a bi-directional two-wire serial bus that provides a communication link between integrated circuits. Microprocessor/microcontroller 420 is interfaced with the user using I²C bus 410 to allow the user to input the voltage at which the user wants to run the processors 110, 120, 130, 140. User input can be accomplished using a higher-level interface device, for example, a console. Microprocessor/ microcontroller 420 can be programmed to automatically convert the user input into the appropriate commands to modulate the voltage of the processors 110, 120, 130, 140 without requiring the user to know the appropriate settings of the configuration bits of the trim pins of DC-to-DC converter 450.

Microprocessor/microcontroller 420 generates "trim in" signal 430, an N bits wide control signal that is input to the trim pins of DC-to-DC converter 450. The "trim in" signal 430 contains information regarding voltage modulation from the user. The "trim in" signal 430 is provided to DC-to-DC converter 450 to provide an appropriate input into the trim pins of DC-to-DC converter 450 to control the voltage of the processors 110, 120, 130, 140. The "voltage in" signal 440 is also provided to DC-to-DC converter 450 in order to provide a reference voltage level against which the processor voltage is compared. The reference voltage level represents the global system power of multi-processor systems 100, the maximum voltage accessible by any one processor 110, 120, 130, 140 hosted within multi-processor system 100. DC-to-DC converter 450 then generates the appropriate output voltage 460 for the processors 110, 120, 130, 140 to optimize performance of the processors 110, 120, 130, 140 within the thermal and power limitations of the multi-processor system 100. The output voltage 460 is applied to the various processors 110, 120, 130, 140 using the trim pins of DC-to-DC converter 450.

Figure 5:
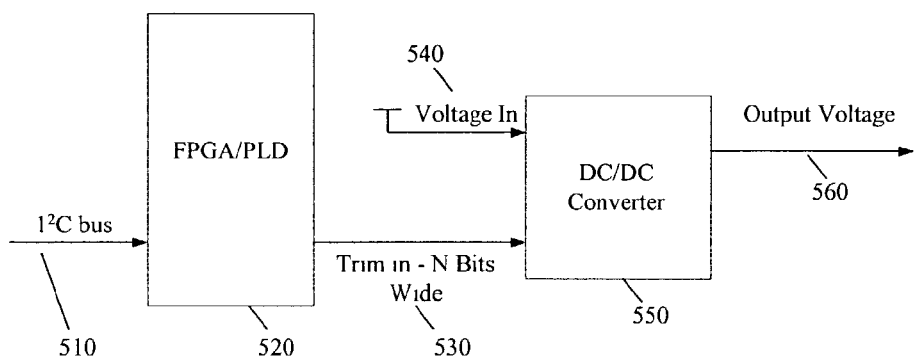
FIG. 5 illustrates a block diagram depicting an embodiment of a method of managing the operating voltage of individual processors by use of a field programmable gate array or programmable logic device.

FIG. 5 illustrates a block diagram depicting an embodiment of a method of managing the operating voltage of individual processors by use of a field-programmable gate array (FPGA) or programmable logic device (PLD), generally designated by the reference numeral 500. FPGA/PLD method 500 includes: providing a control signal from I²C bus 510; providing the control signal to an FPGA/PLD 520; generating a "Trim in" signal 530; providing a "voltage in" signal 540; providing the "voltage in" signal 540 to trim pins of a DC-to-DC converter 550; and generating an output voltage 560.

An I²C bus 510 is used to control FPGA/PLD 520. As is known to those skilled in the art, I²C bus 510 is a bi-directional two-wire serial bus that provides a communication link between integrated circuits. A FPGA is a chip is a particular type of PLD that can be programmed in the field after manufacture. The FPGA/PLD 520 is interfaced with the user using I²C bus 410 to allow the user to input the voltage at which the user wants to run the processors 110, 120, 130, 140. User input can be accomplished using a higher-level interface device, for example, a console. Like the use of microcontroller/microprocessor 420 described with reference to FIG. 5, FPGA/PLD 520 allows the user to control the voltage modulation in a more transparent way, i.e., the user is not required to know the appropriate settings of the configuration bits of the trim pins of DC-to-DC converter 550.

FPGA/PLD 520 generates "trim in" signal 530, an N bits wide control signal that is input to the trim pins of DC-to-DC converter 550. The "trim in" signal 530 contains information regarding voltage modulation from the user. The "trim in" signal 530 is provided to DC-to-DC converter 550 to provide an appropriate input into the trim pins of DC-to-DC converter 550 to control the voltage of the processors 110, 120, 130, 140. The "voltage in" signal 540 is also provided to DC-to-DC converter 550 in order to provide a reference voltage level against which the processor voltage is compared. The reference voltage level represents the global system power of multi-processor systems 100, the maximum voltage accessible by any one processor 110, 120, 130, 140 hosted within multi-processor system 100. DC-to-DC converter 550 then generates the appropriate output voltage 560 for the processors 110, 120, 130, 140 to optimize performance of the processors 110, 120, 130, 140 within the thermal and power limitations of the multi-processor system 100. The output voltage 560 is applied to the various processors 110, 120, 130, 140 using the trim pins of DC-to-DC converter 550.

Figure 6:
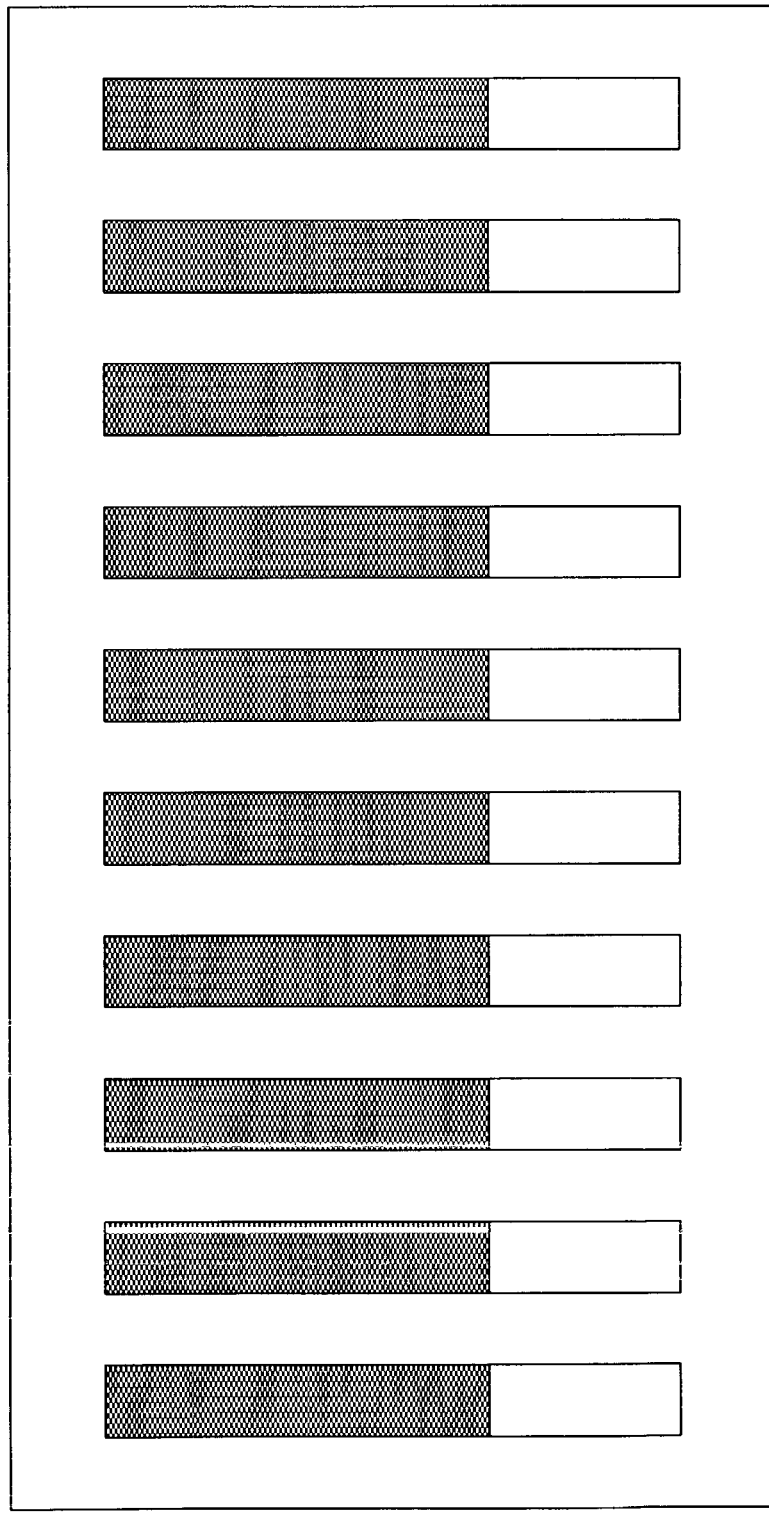
FIG. 6 illustrates a block diagram depicting a series of processors inside of a multi-processor system chassis.

FIG. 6 illustrates a block diagram depicting a series of processors inside of the chassis of multi-processor system 100 running at the same voltage, generally designated by the reference numeral 600. The shading of the individual processors indicates that each individual processor is operating at the same voltage level. Operating processors at the same voltage is typical in current multi-processor system. In addition, the shading illustrates that each processor is operating at below a maximum performance level of that processor in order to remain under the maximum power allocated to the system as a whole. As discussed previously, multi-processor systems are limited by an underlying power and thermal envelope. This is due to the heat produced within the processors and to the limited dimensions in the chassis. When the chassis consumes a given amount of the power, the chassis is typically limited in the amount of airflow that is available to cool the processors. As a result, the power limitation limits the voltage at which the processors can run, and thus, limits the performance. Thus, the processors are limited in their ability to operate at optimal performance and capacity, depending on the processes they need to execute, because the processors are configured to operate at the same voltage—a voltage below their maximum level.

Figure 7:
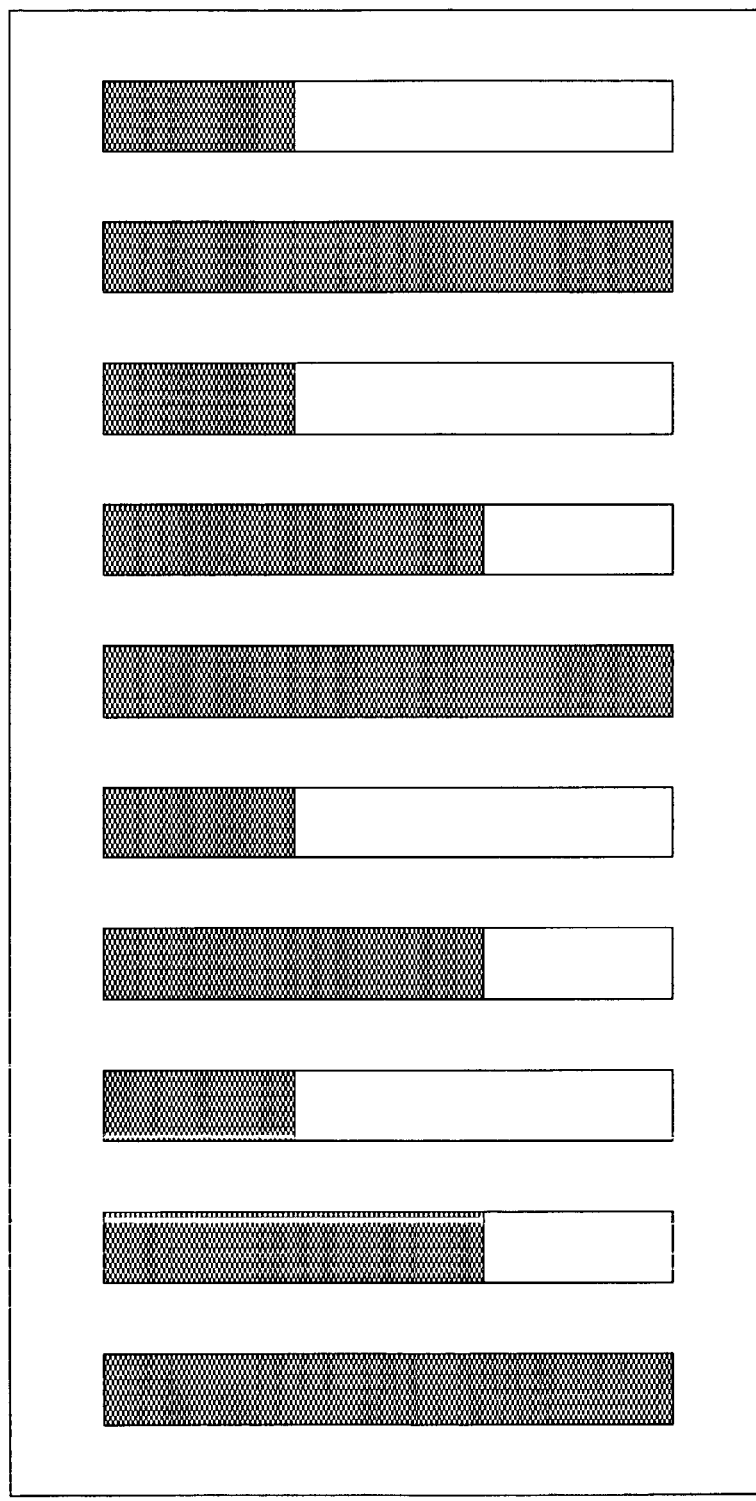
FIG. 7 illustrates a block diagram depicting a series of processors inside of a multi-processor system chassis running at different voltages.

FIG. 7 illustrates a block diagram depicting a series of processors inside of a multi-processor chassis running at different voltages, generally designated by the reference numeral 700. The system FIG. 7 represents a system where the user has been able to manually or automatically adjust the voltage levels of the various processors in the chassis using at least one of the various methods described previously. As a result, the overall system runs at a much more efficient level. As seen in the FIGURE, each processor is now only using the requisite voltage level that is required for its particular function within the system. Because of the varying levels of voltage available to the individual processors, processors that require a higher voltage than the average can now operate at a more optimum level. Similarly, processors that require less power no longer require to be run at the same voltage level as the other processors. As a result, a more efficient system is created.

While the methods for manually managing the operating voltage of individual processors, in a multi-processor computer system have been described in connection with an exemplary embodiment, those skilled in the art will understand that many modifications in light of these teaching are possible, and this application is intended to cover any variation thereof.

It is to be appreciated that the principles disclosed herein may be applied to a system comprised of blades or processors that share a common chassis or to an architecture system that spans multiple chassis. That is, the principles may be applied to systems that are divided by either a physical or logical partition. For example, physically, a system may include three chassis, with each chassis having eight processors. Logically, the same system could be partitioned into five different web servers for five different customers. Power constraints within a chassis typically concern the physical partition of the system. Power constraints imposed on a customer or application that is located in multiple chassis, typically concern logical partitions. One of ordinary skill in the art would readily recognize that the innovations described above may be applied to both physically and logically partitioned architectures.

For example, the disclosed system and method makes use of specific I²C devices that are used to received signals from an I²C bus. Other I²C devices could likewise be used. Thus, the devises shown and referenced generally throughout this disclosure, and unless specifically noted, are intended to represent any and all devices/technologies appropriate to perform the desired function. Likewise, there are disclosed several processors that perform various operations. The specific processor is not important to the system and method described herein. Thus, it is not Applicants' intention to limit the system or method described herein to any particular form of processor or specific multi-processor system.

Further examples exist throughout the disclosure, and it is not Applicants' intention to exclude from the scope of this disclosure the use of structures, materials, or acts that are not expressly identified in the specification, but nonetheless are capable of performing a claimed function.

The invention claimed is:

1. A method for managing processor voltage in a multi-processor computer system, said method comprising the steps of:
   operating a first processor at a first voltage level, said first processor requiring a first level of performance, wherein said first processor consumes a first portion of a thermal and power budget in said multi-processor computer system based upon said first level of performance;
   operating a second processor at a second voltage level, said second processor requiring a second level of performance, wherein said second processor consumes a second portion of the thermal and power budget in said multi-processor computer system based upon said second level of performance; and
   maintaining an overall thermal and power budget and optimizing performance by modulating at least one of said first voltage and said second voltage in said multi-processor computer system, wherein said first voltage level and said second voltage level are unequal fractions of a total voltage allowance of said multi-processor computer system and wherein said total voltage allowance is determined by an overall thermal and power budget allocation of said multi-processor computer system.

2. The method according to claim 1, further comprising steps of:
   modulating a first frequency level of said first processor, said first frequency level allowing said first processor to process at said first level of performance; and
   modulating a second frequency level of said second processor, said second frequency level allowing said second processor to process at said second level of performance.

3. The method according to claim 2, wherein said modulation of said first voltage and said modulation of said first frequency occur simultaneously.

4. The method according to claim 2, wherein said modulation of said second voltage and said modulation of said second frequency occur simultaneously.

5. The method according to claim 2, further comprising: modulating said first frequency and said second frequency simultaneously.

6. The method according to claim 1, further comprising: modulating said first voltage and said second voltage simultaneously.

7. The method according to claim 1, further comprising: determining the first voltage level and the second voltage level from an input selected from a group consisting of a (1) user interface, said user interface receiving an input signal defined by a user, wherein said input signal comprises instructions for modulating a first voltage level of a first processor, which performs at a first performance level, and a second voltage level of a second processor, which performs at a second performance level, and (2) a serial presence detect circuit, said serial presence detect circuit computing a first output voltage of a first processor and a second output voltage of a second processor based on a first optimal performance level of said first processor and a second optimal performance level of said second processor and generating an input signal, wherein said input signal comprises instructions for modulating a first voltage level of a said first processor and a second voltage level of said second processor.

8. A system for managing processor voltage in a multi-processor computer comprising:
   means for modulating a first voltage level of a first processor within said multi-processor computer, said first processor processing at a first performance level; and
   means for modulating a second voltage level of a second processor within said multi-processor computer, said second processor processing at a second performance level, wherein said first performance level is higher than said second performance level and an overall thermal and power budget of said multi-processor computer is maintained, wherein said first voltage level and said second voltage level are unequal fractions of a total voltage allowance of said multi-processor computer and wherein said total voltage allowance is determined by an overall thermal and power budget allocation of said multi-processor computer.

9. The system according to claim 8, further comprising:
   means for modulating a first frequency level of said first processor, said first frequency level allowing said first processor to process at said first performance level; and
   means for modulating a second frequency level of said second processor, said second frequency level allowing said second processor to process at said second performance level.

10. The system according to claim 9, wherein said modulation of said first voltage and said modulation of said first frequency occur simultaneously.

11. The system according to claim 9, wherein said modulation of said second voltage and said modulation of said second frequency occur simultaneously.

12. The system according to claim 9, further comprising: modulating said first frequency and said second frequency simultaneously.

13. The system according to claim 8, wherein said multi-processor computer is based on an architecture chosen from a group consisting of: PA-RISC, JA-32 and IA-64.

14. The system according to claim 8, wherein said multi-processor computer is physically partitioned.

15. The system according to claim 8, wherein said multi-processor computer is logically partitioned.

16. The system according to claim 8, further comprising: modulating said first voltage and said second voltage simultaneously.

17. The system according to claim 8, further comprises:
an input selected from a group consisting of a (1) user interface, said user interface receiving an input signal defined by a user, wherein said input signal comprises instructions for modulating a first voltage level of a first processor, which performs at a first performance level, and a second voltage level of a second processor, which performs at a second performance level, and (2) a serial presence detect circuit, said serial presence detect circuit computing a first output voltage of a first processor and a second output voltage of a second processor based on a first optimal performance level of said first processor and a second optimal performance level of said second processor and generating an input signal, wherein said input signal comprises instructions for modulating a first voltage level of a said first processor and a second voltage level of said second processor.

* * * * *

UNITED STATES PATENT AND TRADEMARK OFFICE
CERTIFICATE OF CORRECTION

PATENT NO. : 7,100,056 B2 Page 1 of 1
APPLICATION NO. : 10/216286
DATED : August 29, 2006
INVENTOR(S) : Andrew H. Barr et al.

It is certified that error appears in the above-identified patent and that said Letters Patent is hereby corrected as shown below:

In column 12, line 60, in Claim 13, delete "JA-32" and insert -- IA-32 --, therefor.

Signed and Sealed this

Twenty-sixth Day of January, 2010

David J. Kappos
*Director of the United States Patent and Trademark Office*